United States Patent
Pukkila et al.

(10) Patent No.: US 6,418,175 B1
(45) Date of Patent: Jul. 9, 2002

(54) METHOD FOR DETERMINING STRENGTH OF CO-CHANNEL SIGNALS, AND A RECEIVER

(75) Inventors: Markku Pukkila, Espoo; Pekka Ranta, Nummela, both of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/202,808
(22) PCT Filed: Jul. 2, 1997
(86) PCT No.: PCT/FI97/00431
    § 371 (c)(1),
    (2), (4) Date: Dec. 22, 1998
(87) PCT Pub. No.: WO98/01959
    PCT Pub. Date: Jan. 15, 1998

(30) Foreign Application Priority Data

Jul. 3, 1996 (FI) .................................................. 962736

(51) Int. Cl.$^7$ ............................. H04L 1/02; H04L 27/06
(52) U.S. Cl. ........................................ 375/347; 375/341
(58) Field of Search .............................. 375/231, 230, 375/262, 341, 347, 267, 340, 316, 343, 346, 285, 219; 455/296, 132, 137, 133

(56) References Cited

U.S. PATENT DOCUMENTS

| | | | | |
|---|---|---|---|---|
| 4,765,753 A | | 8/1988 | Schmidt .................... 370/332 |
| 5,297,169 A | * | 3/1994 | Backstrom et al. ......... 375/231 |
| 5,499,272 A | * | 3/1996 | Bottomley .................. 375/347 |
| 5,519,727 A | * | 5/1996 | Okamoue et al. ........... 375/231 |
| 5,537,443 A | * | 7/1996 | Yoshino et al. ............. 375/340 |
| 5,621,769 A | * | 4/1997 | Wan et al. .................. 375/347 |
| 5,648,991 A | * | 7/1997 | Namekata et al. .......... 375/341 |
| 5,701,333 A | * | 12/1997 | Okanoue et al. ........... 375/347 |
| 5,933,768 A | * | 8/1999 | Skold et al. ................ 375/346 |
| 5,995,499 A | * | 11/1999 | Hottinen et al. ............ 375/349 |
| 6,130,909 A | * | 10/2000 | Anvari et al. ............... 375/232 |
| 6,178,196 B1 | * | 1/2001 | Naguib et al. .............. 375/347 |

FOREIGN PATENT DOCUMENTS

| | | |
|---|---|---|
| EP | 0 637 139 | 2/1995 |
| EP | 0 667 683 | 8/1995 |

OTHER PUBLICATIONS

Bottomley, et al., "Adaptive Arrays and MLSE Equalization", 1995 IEEE 45$^{th}$ Vehicular Technology Conference (Chicago, IL), pp. 50–54 (Jul. 25, 1995).

* cited by examiner

Primary Examiner—Tesfaldet Bocure
(74) Attorney, Agent, or Firm—Altera Law Group, LLC

(57) ABSTRACT

The invention relates to a method for determining the strength of co-channel signals, and a receiver utilizing the method. The training sequences of the signals to be received are classified into subsets, and a channel estimate related to the signal is formed by comparing the training sequences of the received signal to the training sequences of the subset signals. By means of the channel estimate, a strength estimate is formed for each received signal, the estimate being used to arrange the received signals according to their strength. When the signal strengths are known, it is possible to decrease the effect of the interference signals on the signal to be detected. In a diversity receiver, a correlation result can be formed of the channel estimates of the signals of each subset, excluding the signal to be detected, the result being used in interference elimination.

23 Claims, 3 Drawing Sheets

METHOD FOR DETERMINING STRENGTH OF CO-CHANNEL SIGNALS, AND A RECEIVER

FIELD OF THE INVENTION

The invention relates to a method for determining strength of co-channel signals, the method being used in a digital radio system comprising several base stations and subscriber terminals, which operate as transmitters and receivers for signals that are desired signals and/or interference signals and that propagate in channels and that comprise at least one predetermined sequence characteristic of the transmitter, the signals being sampled when they are received.

The invention also relates to a method for determining strength of co-channel signals, the method being used in a digital radio system comprising several base stations and subscriber terminals, which operate as transmitters and receivers for signals that are desired signals and/or interference signals and that propagate in channels and that comprise at least one predetermined sequence characteristic of the transmitter, the receivers comprising diversity branches.

The invention further relates to a receiver arranged to be used in a digital radio system comprising several base stations and subscriber terminals, which operate as transmitters and receivers for signals that propagate via channels and that are desired signals and/or interference signals and that comprise at least one predetermined sequence, the receivers being arranged to sample the signals.

BACKGROUND OF THE INVENTION

In a cellular radio system, the quality of a connection between a base station and a subscriber terminal varies continuously. This variation is due to the attenuation of the radio waves as a function of distance and time on a fading channel, and to the interfering factors occurring over the radio path, such as other signals on the same channel. In a cellular radio system, it is necessary to use the same frequency repeatedly in different cells due to the limited frequency range. In such a case, a receiver operating on a frequency usually receives co-channel signals that originate from several transmitters and that have propagated along several different paths and are therefore multipath signals. The capacity of the receiver can be improved by using common detection of the strongest interference. For this purpose, the receiver should determine the strength levels of different signals and perform co-channel estimation on the signals. However, the problem in the prior art is locating the strongest signals.

The invention can be applied particularly in a digital cellular radio system where transmission occurs on a time division modulation basis. In such a case, one time slot typically comprises one burst transmitted by a subscriber terminal or a base station. A burst sequence usually comprises a start, data, training and stop sequence. The training sequence is predetermined. The length of the start and stop sequences is only a few symbols, but the data and training sequences usually have a length of several dozens of symbols. The training sequence represents a predetermined sequence. Since the number of known symbols in the training sequence is relatively small, whereas the number of signals is often rather great, the problem in the prior art is that the training sequence is not useful for the formation of signal strength estimates and the strongest signals and/or interference cannot therefore be located.

Multipath reception often utilizes diversity receivers. The most common diversity receivers combine the signals before or after the detection and they include for example selective combining, maximal-ratio combining and equal-gain combining. In prior art combining, strong interference is easily combined with the actual signal since the combining is based on the signal-to-noise ratio. A diversity branch that does not receive a signal or receives a wrong signal should not be used in the combining.

CHARACTERISTICS OF THE INVENTION

The purpose of the present invention is to facilitate the finding of both desired signals and interference and to make diversity combining more effective.

This is achieved with a method of the type described in the preamble, characterized by forming subsets of predetermined sequences from the predetermined sequences related to the signals to be received, performing channel estimation separately for each subset based on the samples of the received co-channel signals and the subsets formed, and a channel estimate related to each subset being formed as a result of the estimation, and forming by means of the channel estimate, an estimate signal for the subset, the signal being compared to the received signal, and forming, by means of said comparison, a strength estimate that describes the strength of at least one signal of the subset and that is used to select at least one subset with the greatest signal strength.

The method according to the invention is also characterized by forming subsets of predetermined sequences from the predetermined sequences related to the signals to be received, performing channel estimation separately for each subset based on the samples of the received co-channel signals and the subsets formed, and a channel estimate related to each subset being formed as a result of the estimation, and forming, by means of the channel estimate, an estimate signal for the subset, the estimate being compared to the received signal, and forming, by means of said comparison, a strength estimate that describes the strength of at least one signal of the subset and that is used when at least one subset with the greatest signal strength is selected, and forming from the channel estimates a correlation result between the diversity branches, the result being used to decrease the amount of interference, for example.

The receiver according to the invention is characterized in that the receiver comprises sequential means and grouping means for forming subsets of predetermined sequences from the predetermined sequences that are related to the signals to be received and that are stored in the sequential means, and the receiver comprises channel estimation means for carrying out channel estimation separately for each subset, the estimation being arranged to take place by means of the received signal samples and the subsets formed, and to form a channel estimate related to each subset, and the channel estimation means are arranged to form an estimate signal by means of the channel estimate and the predetermined sequence, and to compare the received signal and the estimate signal for the subset, and the channel estimation means are arranged to form, by means of said comparison, strength estimates for the subset signals.

The method according to the invention provides considerable advantages. The invention enables the finding of the strongest signals, especially interference signals, with great likelihood. Another advantage is particularly that without restricting the number of the co-channel signals it is possible to form the signal strength estimates by using a short predetermined training sequence. For example in a GSM system, only a few dozen predetermined symbols can be used in a training sequence, but in the present method the number of the required parameters to be estimated is smaller. In diversity combining, only the desired signals are combined and the interference is suppressed by means of the method according to the invention, so that the signal-to-noise ratio is improved and the symbol detection is more reliable. The arrangement according to the invention can be applied especially in interference elimination.

DESCRIPTION OF THE FIGURES

In the following, the invention will be described in greater detail with reference to the examples according to the accompanying drawings, in which.

DESCRIPTION OF THE PREFERRED EMBODIMENTS

The arrangement according to the invention can be applied especially to DCS and GSM systems without restricting the invention thereto, however.

Figure 1:
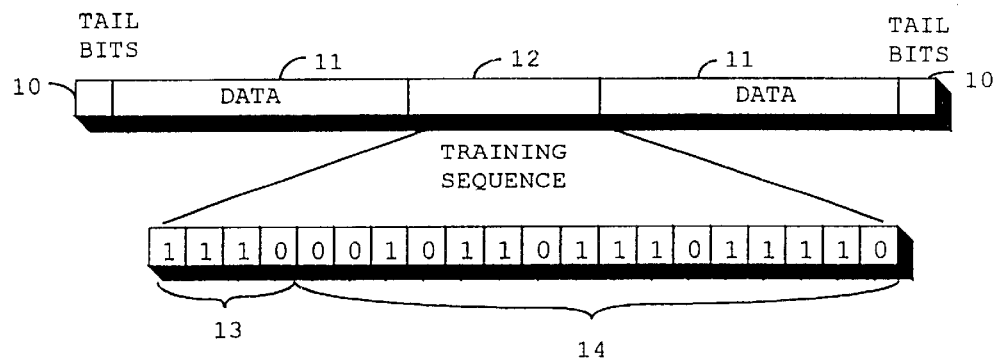
FIG. 1 shows a normal burst in a GSM system.

Examine below the arrangement according to the invention in greater detail, applied to a GSM system. A normal burst of a GSM system is as shown in FIG. 1. A normal burst typically comprises altogether about 150 symbols. A symbol represents a bit or a bit combination. Symbols of a burst are arranged in sequences that contain start symbols and stop symbols or tail symbols 10, data symbol sequences 11 that are provided in two parts, and training symbols 12. Assume that the symbols are bits, as usual. In such a case, a training sequence can be shown in the manner of FIG. 1, where at the beginning of a training sequence there are four guard bits 13 that are identical to the four bits at the end of the training sequence. In addition to the guard bits, the training sequence also comprises reference bits 14, the number of which is usually 16.

The arrangement according to the invention is based on the transmission of a predetermined sequence, which is preferably characteristic of each transmitter, to the receiver with the signal. The signal may be a desired signal or a signal that is to be detected, or an interference signal which refers to all the other signals. A predetermined sequence in a GSM system, for example, is preferably a training sequence of a normal burst. This training sequence is used to arrange the received signals according to their strengths from the greatest to the weakest. Typically one set with great signal strength is selected from these signal sets. This set may be a set of desired signals or interference signals. If the subset is a set of interference signals, the effect of the interference can be reduced in the received co-channel signal and a desired signal containing less interference than originally can thus be transferred to the detection.

In order to determine signal strengths, the method according to the invention begins with the estimation of multipath channels. Co-channel estimation is carried out by using, for example, a maximum likelihood (ML) method that is the most common and easily applicable estimation method. The channel estimate $\hat{h}$ can be obtained for example from formula (1)

$$\hat{h}=(M^H V^{-1} M)^{-1} M^H V^{-1} y, \qquad (1)$$

wherein the matrix M is $M=[M_1, M_2, \ldots, M_N]$, V is the covariance of noise, and y is a received multipath-propagated multichannel signal. In a digital radio system, y is formed of samples that are taken from the received signal. $M^H$ is a Hermitian matrix of matrix M and $V^{-1}$ refers to an inverse matrix of matrix V. Assuming that the noise is white, the equation (1) can also be written in the form $$\hat{h}=(M^H M)^{-1} M^H y \qquad (2)$$

The matrix $M_n$ can in turn be represented in the form $$M_n = \begin{bmatrix} m_{L,n} & \cdots & m_{1,n} & m_{0,n} \\ m_{L+1,n} & \cdots & m_{2,n} & m_{1,n} \\ \vdots & \vdots & \vdots & \vdots \\ m_{P+L-1,n} & \cdots & m_{P,n} & p_{P-1,n} \end{bmatrix} \qquad (3)$$

wherein $m_{j,i}$ represents symbols of a predetermined sequence. The noise covariance V can in turn be formed for example in the following manner from two random variables $n_1$ and $n_2$ $$V_{n1,n2}=cov\{n_1,n_2\}=E\{(n_1-\mu_1)(n_2-\mu_2)^T\} \qquad (4)$$

wherein the operator E represents formation of an expected value, $\mu_1$ is an expected value of variable $n_1$, and $\mu_2$ is an expected value of variable $n_2$. Matrix M is assumed to comprise N co-channel signals and the predetermined sequence is assumed to comprise P+L symbols. The received signal y is of the following form for the predetermined sequence $$y=Mh+n \qquad (5)$$

wherein n represents Gaussian noise and h is the channel impulse response.

Examine in greater detail the formation of the matrix M required in the co-channel estimation. Assume for example that the purpose is to provide channel estimation for two signals, and five impulse response taps are estimated for each channel. For example the following training sequence (reference length 16 bits) according to the GSM system is used as the predetermined sequence:

training sequence 1: 0010010111000010 training sequence 2: 0010110111011110

P is now P=16 and L is L=5−1=4 (the number of repetitive bits required is one less than the number of the channel taps to be estimated). Four bits from the end of the training sequence are repeated at the beginning of the sequence, so that the sequences are in full sequence 1: 0010 0010010111000010 sequence 2: 1110 0010110111011110

The co-channel estimation matrix M is now as follows $$M = \begin{bmatrix} 0 & 0 & 1 & 0 & 0 & | & 0 & 0 & 1 & 1 & 1 \\ 0 & 0 & 0 & 1 & 0 & | & 0 & 0 & 0 & 1 & 1 \\ 1 & 0 & 0 & 0 & 1 & | & 1 & 0 & 0 & 0 & 1 \\ 0 & 0 & 1 & 0 & 0 & | & 1 & 0 & 1 & 0 & 0 \\ 1 & 0 & 0 & 1 & 0 & | & 1 & 1 & 0 & 1 & 0 \\ 0 & 1 & 0 & 0 & 1 & | & 0 & 1 & 1 & 0 & 1 \\ 1 & 0 & 1 & 0 & 0 & | & 1 & 0 & 1 & 1 & 0 \\ 1 & 1 & 0 & 0 & 1 & | & 1 & 1 & 1 & 0 & 1 \\ 1 & 1 & 1 & 0 & 1 & | & 1 & 1 & 1 & 0 & 1 \\ 0 & 1 & 1 & 1 & 0 & | & 0 & 1 & 1 & 1 & 0 \\ 0 & 0 & 1 & 1 & 1 & | & 1 & 0 & 1 & 1 & 1 \\ 0 & 0 & 0 & 1 & 1 & | & 1 & 1 & 0 & 1 & 1 \\ 0 & 0 & 0 & 0 & 1 & | & 1 & 1 & 1 & 0 & 1 \\ 1 & 0 & 0 & 0 & 0 & | & 1 & 1 & 1 & 1 & 0 \\ 0 & 1 & 0 & 0 & 0 & | & 0 & 1 & 1 & 1 & 1 \end{bmatrix} \quad (6)$$

The matrix columns are formed such that column p=1 is delayed with one sequence bit with respect to column p.

The method according to the invention is based on the fact that in one estimation process only the subset of the received signals is taken into acount and the other signals are preferably assumed to be noise. This is achieved such that the set of predetermined sequences related to the received signals is classified into subsets. The co-channel estimation is then carried out on a required number of subsets separately in the manner set forth in formula (1) to obtain the impulse response related to each signal. This impulse response is the channel estimate of each signal. After the channel estimate has been formed, the signal strength estimates can be formed in several different manners. When the signals are arranged in order according to their strenghts, the strongest interference signals can be determined and at least partly suppressed with a suitable interference elimination method.

When only the subsets are taken into account, the channel estimate $\hat{h}$ for the subject of the form $$\hat{h}_s = (M_s^H M_s)^{-1} M_s^H Y \quad (7)$$

wherein $\hat{h} = [\hat{h}_{s,1}^T \hat{h}_{s,2}^T \ldots \hat{h}_{s,K}^T]^T$ and $M_s = [M_{s,1} M_{s,2} \ldots M_{s,K}]$ and $\hat{h}_{s,1}^T$ refers to the transpose of the channel estimate $\hat{h}_{s,1}$. The matrices $M_{s,1}$ are formed similarly as the matrix M in formula (6). The size of the group to be estimated is K. All the possible combinations of the different predetermined sequences are preferably selected in turn for the $M_s$, and a specific channel estimate $\hat{h}$ is calculated for each combination.

Figure 2:
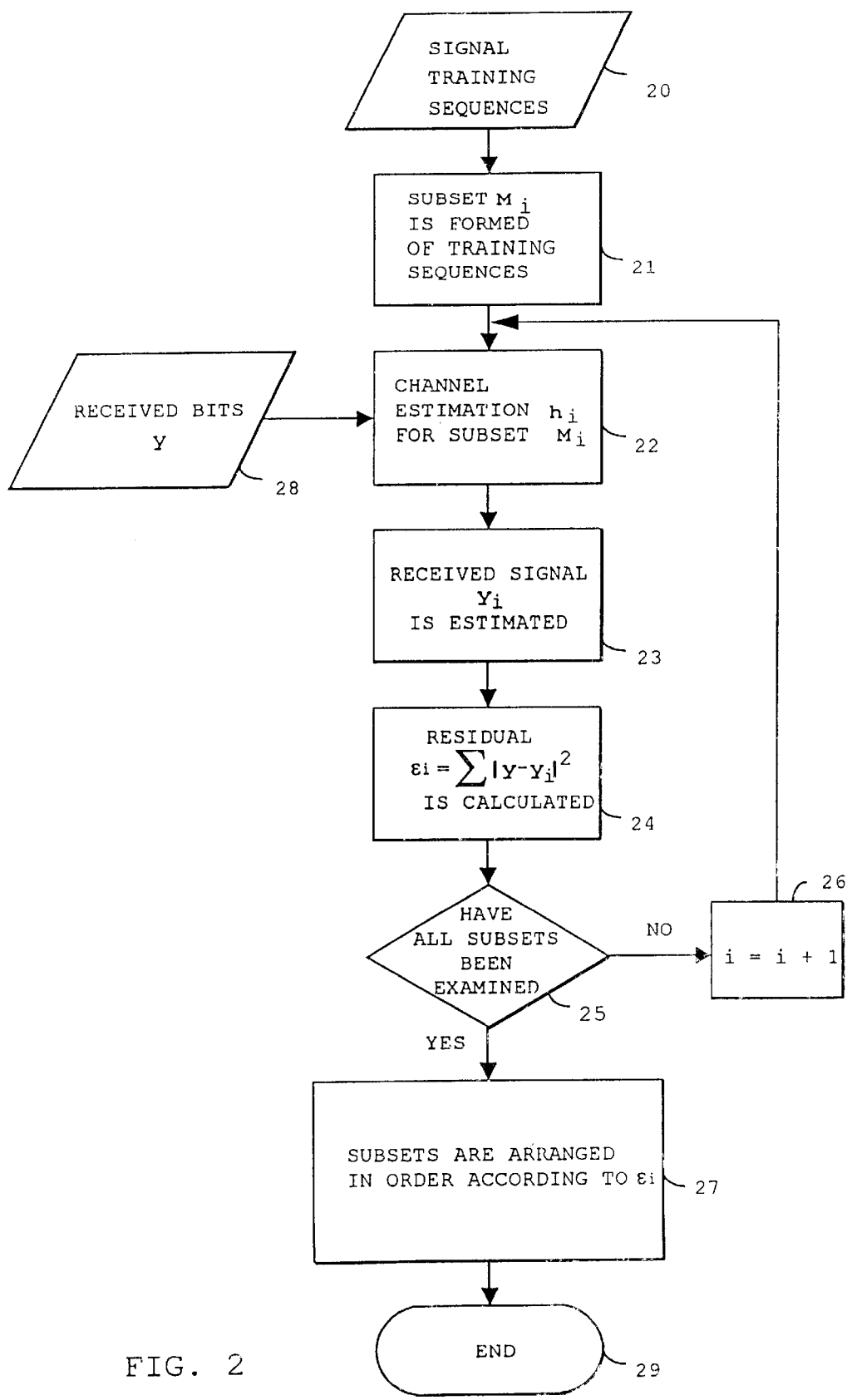
FIG. 2 shows a flow chart of the method according to the invention.

Examine in greater detail the method according to the invention by means of the flow chart of FIG. 2. In a block 20, the predetermined sequences or training sequences to be used are determined. In a block 21, the training sequences are divided into groups such that the subset $M_i$ comprises K training sequences. After this, the received signal y from a block 28 is subjected to- channel estimation by means of the subset $M_i$. In order to determine the signal strengths, channel estimation is utilized and an estimate signal $y_i$ for the received signal is formed in a block 23, so that $y_1 = M_{s,i} \hat{h}_s$. In a block 24, a residual is formed between the received signal y and the estimate signal $y_1$. This is achieved for example by calculating the difference $\epsilon_i$ of the bits in the training sequences of the aforementioned signals for each of the K signals of the subset according to the following formula concerning the sum of square errors $$\epsilon_i = \Sigma |y - y_i|^2 \quad (8)$$

Instead of the difference, the signals can also be compared for example by means of division or by performing some other operation that compares the received signal y and the estimate signal $y_i$ to each other. In a block 25, it is checked whether all the subsets have been examined. If all the subsets have not been examined, the process moves on to the next subset in a block 26 for example by means of indexing i=i+1. The order in which the subsets are examined is not important as long as all the subsets that have been considered significant in advance are examined. After all the desired subsets $M_i$ have been examined, the subsets are classified in order in a block 27 by means of the result $\epsilon_i$ of the signal comparison. For example, when the difference $\epsilon_i$ is small, the subset comprises signals that have great signal strength. The function is terminated in a block 29.

A receiver usually distinguishes an actual signal from an interference signal. For example a subscriber terminal has information about the base station in the actual coverage area of which it is located. Therefore, the subscriber terminal knows that the other signals are interference signals from other cells. When the strength estimates of the different signals are formed, the strongest interference signals can also be found. This information can be utilized preferably in interference elimination, so that at least the strongest interference signals can be suppressed or their effect can be reduced.

In an embodiment according to the invention, the receiver is a subscriber terminal and predetermined sequences of two signals are selected for each subset. The first of these signals is preferably the signal of the base station in the actual coverage area of which the subscriber terminal is located. This signal is naturally usually strong in reception. The other predetermined sequence in the subset is the sequence of some other signal received by the subscriber terminal, such that the predetermined sequence of the signal from the base station of the subscriber terminal can be paired preferably with the predetermined sequences of all the desired signals. These other signals represent interference to the actual signal. The channels of the interference signals can thus be estimated in pairs with the actual signal such that during each estimation round the matrix $M_s$ is formed of two predetermined sequences as shown in formula 6: the sequence of the base station of the subscriber terminal and the sequence of the interfering base station. A similar procedure can be followed when the base station is the receiver and the subscriber terminal is the transmitter.

If the number of the signals including the desired signal is Q, Q -1 channel estimation processes are carried out. In this manner, each interference signal can be assigned one channel estimate. If a subset consists of one signal or two signals one of which is strong, the order of the strength estimates of the subsets corresponds to the order of the signal strength estimates. If the subset is greater, at least the strongest signals can be detected, which is often sufficient for further processing.

The operations in blocks 23 and 24 of the flow chart of FIG. 2 can also be replaced by calculating the sum of the taps of the impulse response estimate to obtain the strength estimate of each signal, and the signals and subsets can be arranged in order according to their strengths. The sum of the taps can be preferably calculated as a square sum or some other algebraic sum.

Figure 3:
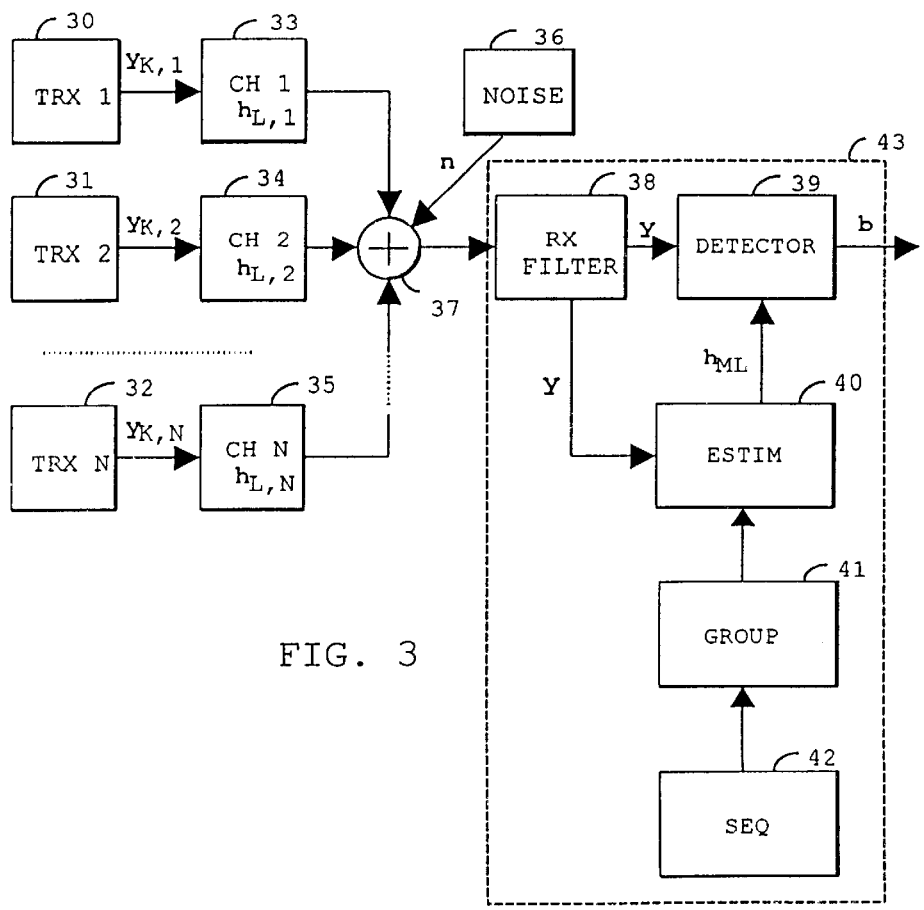
FIG. 3 shows a system model of the arrangement according to the invention.

The system model according to the invention is shown in FIG. 3. The system model comprises transmitters 30 to 32, channels 33 to 35, a noise source 36, an adder 37 combining the channels and the noise, a reception filter 38, a detector 39, channel estimation means 40, grouping means 41 and sequential means 42. The receiver 43 comprises blocks 38 to 42. The transmitters 30 to 32, the number of which is Q and which are for example radio system base stations, transmit their own signal $y_{K,i}$ in a channel $CH_i$ 33 to 35 having an impulse response denoted by $h_i$. Noise n is added to the signals $y_{K,i}$ in the adder 37. The receiver 43, which may be for example a radio system subscriber terminal, i.e. usually a mobile phone, receives a multichannel signal $$\sum_{i}^{Q} y_{K,i} + n$$

with the reception filter 38 that typically comprises an antenna and a radio-frequency filter. After the filtration, the signal y propagates both to the detection 39 and to the channel estimator 40 that performs co-channel estimation in accordance with the method of the invention by utilizing the received signal y and subsets of a predetermined sequence arriving from the grouping means 41. The grouping means 41 form the subsets of the predetermined sequences from the data obtained from the sequential means 42. The detected signal propagates from the detection means 39, which is for example a prior art detection Viterbi algorithm, to the other parts of the receiver (not shown in the figure). Interference elimination is carried out for example in the detection means 39.

As it is well known, information about the signal quality is required for the use of different diversity receivers where the signal arriving from the separate diversity branches is combined. Examine in greater detail the theoretical basis of a diversity receiver. Assume the following: N is the number of co-channel signals, E is the number of antenna elements, L is the length of the channel memory, i.e. L+1 channel taps, and k is the sample index. The received signal sample y in the antenna element e at a moment k is as follows according to formula (5)

$$y_{k,e} = d_k^T h_e + n_{k,e},\quad (9)$$

wherein $d_k^T$ corresponds to the matrix M and comprises the vectors $b_{k,n}$ such that $d_k = [b_{k,1} b_{k,2} \ldots b_{k,N}]^T$, and wherein $b_{k,n} = [b_{k,n} b_{k-1,n} \ldots b_{k-l,n}]$ and it comprises symbols $b_{k,n} \in [-1,1]$ corresponding to the bits in the $m^{th}$ co-channel.

The received signal sample in vector form from the $E^{th}$ antenna element is of the form $$y_{k,e} = \begin{bmatrix} d_k^T h_1 \\ d_k^T h_2 \\ \vdots \\ d_k^T h_E \end{bmatrix} + n_{k,e} \quad (10)$$

In this manner, it is possible to form a correlation result in the form of a spatial correlation matrix $R_k$ $$R_k = y_k y_k^T \quad (11)$$

This can also be represented stochastically in the form $R = \langle y_k y_k^T \rangle$, which is in greater detail as follows $$R = \begin{bmatrix} h_1 h_1^{*T} & \cdots & h_1 h_E^{*T} \\ \vdots & \vdots & \vdots \\ h_E h_1^{*T} & \cdots & h_E h_E^{*T} \end{bmatrix} + \sigma^2 I \quad (12)$$

wherein $h_i$ is the impulse response of the $i^{th}$ antenna element or diversity branch, $h^*$ is the complex conjugate of the impulse response, $\sigma^2$ is the effective value of noise and I is a unit matrix. The impulse response h preferably comprises the impulse responses of all the co-channel signals one after another. The size of the matrix R is E×E when E is the number of the antenna elements. If the impulse response of the desired signal is eliminated from the matrix R, the correlation matrix R is the matrix of the interference and it can be used directly in the algorithm, which is described in greater detail in Adaptive Antennas and MLSE equalisation by G. Bottomley, Proc. of IEEE Vehicular Tech. Conf., Chicago, 1995, which is incorporated herein by reference. The algorithm is of the MLSE (Maximum Likelihood Sequence Estimation) type and it searches for the most likely transmission sequence. For example, if the impulse response of the signal from the base station in the coverage area of which the subscriber terminal is located is ignored in formula (12), a matrix R that consists only of the interference channel estimates is obtained and the effect of the signals interfering with the base station signal can be reduced.

Figure 4:
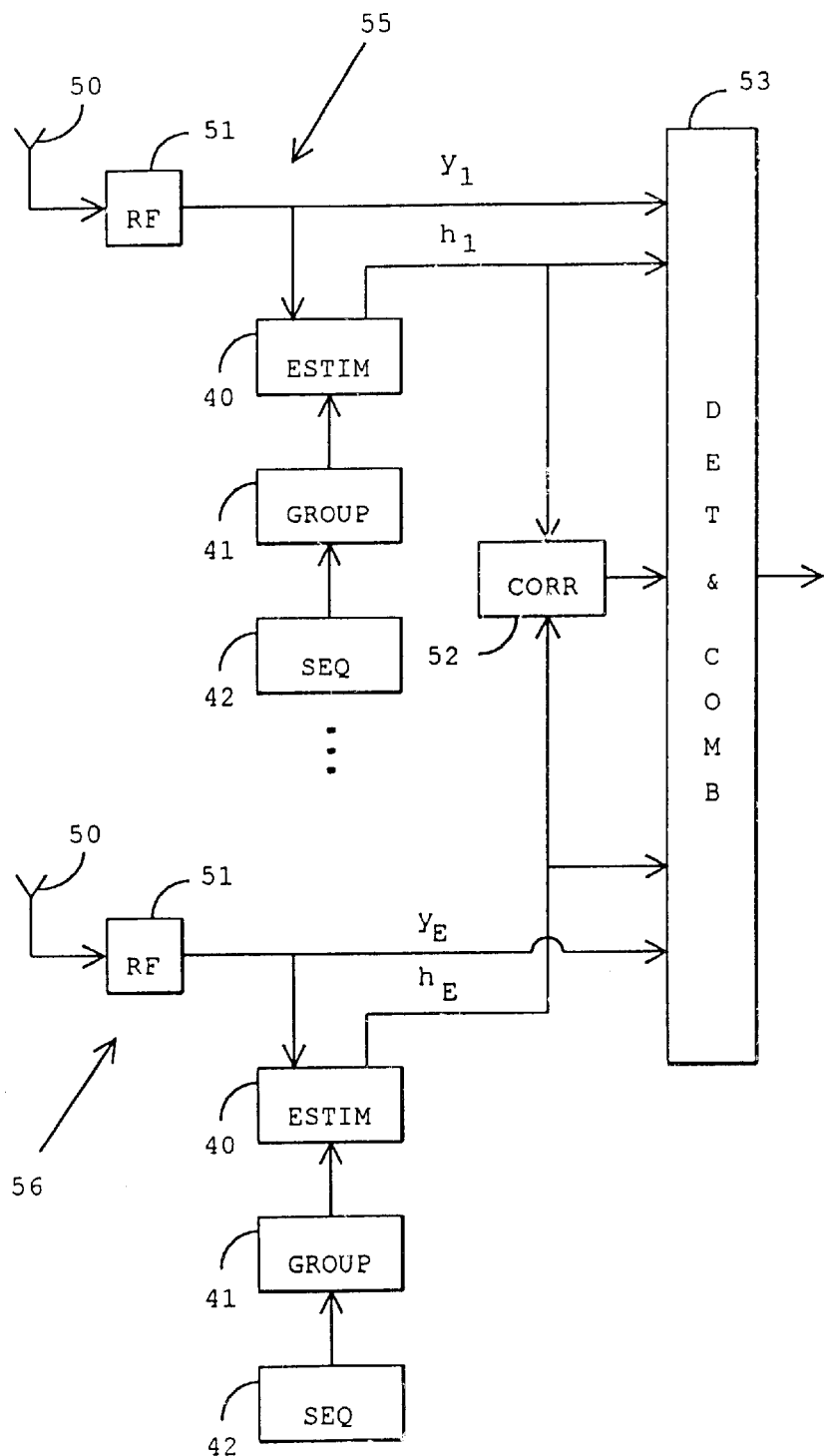
FIG. 4 shows a diversity receiver.

FIG. 4 shows a receiver arrangement according to the invention. The receiver comprises E antennas 50, filters 51, correlation means 52, combining and detection means 53, channel estimation means 40, grouping means 41 and sequential means 42. In this arrangement, a signal received by the antenna 50 propagates through the filter 51 to the channel estimator 40 of each diversity branch and to the combining and detection means 53. The channel estimation is carried out in each diversity branch in accordance with the method of the invention with the means 40 to 42, wherein the means 42 store the predetermined sequences, the means 41 form subsets of the sequences and the means 40 form the channel estimate. After this, a correlation matrix R having a size E×E, where E is preferably the number of the diversity branches 55 to 56 used, is calculated in the correlation means 52, which is a conventional correlator, from the impulse responses of the interfering signals. This correlation matrix is used, for example, to decrease the amount of interference when the signals are combined in the combining and detection means 53.

The predetermined sequence should have good auto- and cross-correlation properties so that the method according to the invention would operate in the best possible manner. The different sequences can be divided into binary and polyphase sequences. A known binary sequence family is the Gold sequences. They are formed for example with shift registers from m sequences. The cross-correlation of the Gold sequences has three values $$-\frac{1}{N}t(n),\ -\frac{1}{N},\ \frac{1}{N}[t(n)-2],\ \text{wherein } t(n) \text{ is}$$

$$t(n) = \begin{cases} 1 + 2^{0.5(n+1)}, & \text{if } n \text{ is an odd number} \\ 1 + 2^{0.5(n+2)}, & \text{if } n \text{ is an even number} \end{cases}$$

and n is n=1, 2, 3, ..., N is the sequence length, and N is $N=2^n-1$. A Gold sequence suitable as the predetermined sequence has preferably a length of 31 symbols, in which case the cross-correlations obtain the values $-9/31, -1/31$ and $7/31$. There are 33 Gold sequences having a length of 31 symbols. In the method according to the invention, it is preferable to use these sequences as the predetermined sequence 12:

| # | | | | | | | | | | | | | | | | | | | |
|---|---|---|---|---|---|---|---|---|---|---|---|---|---|---|---|---|---|---|---|
| 1  | 0 | 0 | 0 | 1 | 1 | 0 | 1 | 1 | 1 | 1 | 0 | 1 | 1 | 0 | 1 | 0 | 0 | 0 | 1 |
| 2  | 1 | 1 | 0 | 0 | 0 | 1 | 0 | 0 | 1 | 1 | 1 | 1 | 1 | 1 | 0 | 0 | 0 | 0 | 1 |
| 3  | 0 | 1 | 1 | 1 | 1 | 0 | 1 | 0 | 1 | 0 | 1 | 1 | 0 | 0 | 0 | 0 | 0 | 0 | 0 |
| 4  | 0 | 0 | 0 | 0 | 0 | 1 | 1 | 0 | 0 | 0 | 1 | 0 | 1 | 0 | 0 | 0 | 0 | 1 | 0 |
| 5  | 1 | 1 | 1 | 1 | 1 | 1 | 1 | 1 | 0 | 0 | 0 | 1 | 1 | 0 | 0 | 0 | 1 | 1 | 1 |
| 6  | 0 | 0 | 0 | 0 | 0 | 1 | 1 | 0 | 1 | 0 | 1 | 1 | 1 | 0 | 0 | 0 | 1 | 0 | 0 |
| 7  | 1 | 1 | 1 | 0 | 1 | 0 | 0 | 1 | 1 | 0 | 1 | 1 | 1 | 0 | 1 | 1 | 0 | 1 | 0 |
| 8  | 0 | 0 | 1 | 0 | 0 | 0 | 0 | 0 | 0 | 1 | 1 | 1 | 1 | 1 | 0 | 1 | 1 | 1 | 1 |
| 9  | 1 | 0 | 1 | 1 | 0 | 0 | 1 | 1 | 0 | 0 | 1 | 1 | 0 | 1 | 0 | 1 | 1 | 0 | 1 |
| 10 | 1 | 0 | 0 | 1 | 0 | 1 | 0 | 1 | 0 | 0 | 0 | 1 | 1 | 0 | 1 | 0 | 0 | 0 | 0 |
| 11 | 1 | 1 | 0 | 1 | 1 | 0 | 0 | 1 | 0 | 0 | 0 | 1 | 1 | 1 | 0 | 0 | 0 | 1 | 0 |
| 12 | 0 | 1 | 0 | 0 | 0 | 0 | 0 | 1 | 0 | 1 | 0 | 1 | 0 | 1 | 0 | 0 | 1 | 1 | 0 |
| 13 | 0 | 1 | 1 | 1 | 0 | 0 | 0 | 1 | 1 | 1 | 1 | 0 | 0 | 0 | 0 | 1 | 1 | 1 | 0 |
| 14 | 0 | 0 | 0 | 1 | 0 | 0 | 0 | 0 | 1 | 0 | 0 | 0 | 1 | 0 | 1 | 1 | 1 | 1 | 1 |
| 15 | 1 | 1 | 0 | 1 | 0 | 0 | 1 | 0 | 0 | 1 | 0 | 1 | 1 | 1 | 1 | 1 | 1 | 0 | 0 |
| 16 | 0 | 1 | 0 | 1 | 0 | 1 | 1 | 1 | 1 | 1 | 1 | 1 | 0 | 1 | 1 | 1 | 0 | 1 | 1 |
| 17 | 0 | 1 | 0 | 1 | 1 | 1 | 0 | 0 | 1 | 0 | 1 | 0 | 0 | 1 | 1 | 0 | 1 | 0 | 1 |
| 18 | 0 | 1 | 0 | 0 | 1 | 0 | 1 | 0 | 0 | 0 | 0 | 0 | 1 | 0 | 1 | 0 | 0 | 0 | 0 |
| 19 | 0 | 1 | 1 | 0 | 0 | 1 | 1 | 1 | 0 | 1 | 0 | 0 | 0 | 1 | 0 | 0 | 1 | 1 | 1 |
| 20 | 0 | 0 | 1 | 1 | 1 | 1 | 0 | 1 | 1 | 1 | 0 | 0 | 1 | 1 | 0 | 0 | 1 | 0 | 0 |
| 21 | 1 | 0 | 0 | 0 | 1 | 0 | 0 | 1 | 1 | 0 | 1 | 0 | 0 | 0 | 1 | 0 | 1 | 1 | 1 |
| 22 | 1 | 1 | 1 | 0 | 0 | 0 | 1 | 0 | 1 | 1 | 1 | 0 | 1 | 0 | 1 | 0 | 1 | 0 | 0 |
| 23 | 0 | 0 | 1 | 1 | 0 | 1 | 1 | 0 | 1 | 0 | 0 | 1 | 1 | 1 | 0 | 1 | 0 | 1 | 0 |
| 24 | 1 | 0 | 0 | 1 | 1 | 1 | 1 | 0 | 0 | 1 | 1 | 1 | 0 | 0 | 1 | 0 | 1 | 1 | 0 |
| 25 | 1 | 1 | 0 | 0 | 1 | 1 | 1 | 1 | 1 | 0 | 1 | 0 | 1 | 1 | 0 | 1 | 1 | 1 | 1 |
| 26 | 0 | 1 | 1 | 0 | 1 | 1 | 0 | 0 | 0 | 0 | 1 | 0 | 0 | 1 | 1 | 1 | 0 | 1 |   |
| 27 | 0 | 0 | 1 | 0 | 1 | 0 | 1 | 1 | 0 | 1 | 1 | 0 | 1 | 1 | 1 | 1 | 0 | 0 | 1 |
| 28 | 1 | 0 | 1 | 0 | 0 | 1 | 0 | 1 | 1 | 0 | 0 | 1 | 0 | 1 | 1 | 0 | 0 | 0 | 0 |
| 29 | 1 | 0 | 1 | 1 | 1 | 0 | 0 | 0 | 1 | 1 | 0 | 0 | 1 | 0 | 0 | 0 | 1 | 1 |   |
| 30 | 1 | 0 | 0 | 0 | 0 | 0 | 1 | 1 | 1 | 0 | 0 | 0 | 0 | 0 | 0 | 0 | 1 | 0 | 1 |
| 31 | 1 | 1 | 1 | 1 | 0 | 1 | 0 | 0 | 0 | 1 | 0 | 0 | 1 | 0 | 0 | 1 | 0 | 0 | 1 |
| 32 | 1 | 0 | 1 | 0 | 1 | 1 | 1 | 0 | 1 | 1 | 0 | 0 | 0 | 1 | 1 | 1 | 1 | 1 | 0 |
| 33 | 1 | 0 | 1 | 1 | 0 | 1 | 0 | 1 | 0 | 0 | 0 | 1 | 1 | 1 | 0 | 1 | 1 | 1 | 1 |

| # | | | | | | | | | | | | |
|---|---|---|---|---|---|---|---|---|---|---|---|---|
| 1  | 1 | 1 | 1 | 1 | 1 | 1 | 0 | 1 | 0 | 0 | 0 | 0 |
| 2  | 0 | 1 | 0 | 0 | 1 | 1 | 1 | 1 | 0 | 0 | 0 | 1 |
| 3  | 0 | 0 | 1 | 0 | 0 | 1 | 0 | 1 | 0 | 0 | 1 | 0 |
| 4  | 1 | 1 | 1 | 1 | 0 | 0 | 0 | 1 | 0 | 1 | 0 | 0 |
| 5  | 0 | 1 | 0 | 1 | 1 | 0 | 0 | 1 | 1 | 0 | 1 | 1 |
| 6  | 0 | 0 | 0 | 0 | 1 | 0 | 0 | 0 | 0 | 0 | 1 | 0 |
| 7  | 1 | 0 | 1 | 0 | 1 | 0 | 1 | 1 | 1 | 1 | 0 | 1 |
| 8  | 1 | 1 | 1 | 0 | 1 | 1 | 0 | 0 | 1 | 0 | 1 | 0 |
| 9  | 0 | 1 | 1 | 0 | 0 | 0 | 1 | 0 | 0 | 1 | 0 | 1 |
| 10 | 0 | 1 | 1 | 1 | 1 | 1 | 1 | 1 | 1 | 0 | 1 | 0 |
| 11 | 0 | 1 | 0 | 0 | 0 | 1 | 0 | 0 | 0 | 1 | 0 | 0 |
| 12 | 0 | 0 | 1 | 1 | 0 | 0 | 1 | 1 | 1 | 0 | 0 | 0 |
| 13 | 1 | 1 | 0 | 1 | 1 | 1 | 0 | 0 | 0 | 0 | 0 | 1 |
| 14 | 0 | 0 | 0 | 0 | 0 | 0 | 1 | 1 | 0 | 0 | 1 | 1 |
| 15 | 1 | 0 | 1 | 1 | 1 | 1 | 0 | 1 | 0 | 1 | 1 | 1 |
| 16 | 1 | 1 | 0 | 0 | 0 | 0 | 0 | 1 | 1 | 1 | 1 | 0 |
| 17 | 0 | 0 | 1 | 1 | 1 | 0 | 0 | 0 | 1 | 1 | 0 | 1 |
| 18 | 1 | 1 | 0 | 0 | 1 | 0 | 1 | 0 | 1 | 0 | 1 | 1 |
| 19 | 0 | 0 | 1 | 0 | 1 | 1 | 1 | 0 | 0 | 1 | 1 | 1 |
| 20 | 1 | 1 | 1 | 0 | 0 | 1 | 1 | 1 | 1 | 1 | 1 | 1 |
| 21 | 0 | 1 | 1 | 1 | 0 | 1 | 0 | 0 | 1 | 1 | 1 | 1 |
| 22 | 0 | 1 | 0 | 0 | 0 | 0 | 1 | 0 | 1 | 1 | 1 | 0 |
| 23 | 0 | 0 | 0 | 1 | 1 | 1 | 1 | 0 | 1 | 1 | 0 | 0 |
| 24 | 1 | 0 | 0 | 0 | 0 | 1 | 1 | 0 | 1 | 0 | 0 | 1 |
| 25 | 1 | 0 | 1 | 1 | 0 | 1 | 1 | 0 | 0 | 0 | 1 | 0 |
| 26 | 1 | 1 | 0 | 1 | 0 | 1 | 1 | 1 | 0 | 1 | 0 | 0 |
| 27 | 0 | 0 | 0 | 0 | 1 | 0 | 1 | 0 | 1 | 1 | 0 | 0 |
| 28 | 1 | 0 | 0 | 1 | 0 | 0 | 0 | 0 | 0 | 0 | 1 | 1 |
| 29 | 1 | 0 | 0 | 1 | 1 | 0 | 1 | 1 | 0 | 1 | 1 | 0 |
| 30 | 1 | 0 | 0 | 0 | 1 | 1 | 0 | 1 | 1 | 1 | 0 | 0 |
| 31 | 1 | 0 | 1 | 0 | 0 | 0 | 0 | 0 | 1 | 0 | 0 | 0 |
| 32 | 0 | 1 | 1 | 0 | 1 | 0 | 0 | 1 | 0 | 0 | 0 | 0 |
| 33 | 1 | 0 | 0 | 1 | 0 | 0 | 1 | 1 | 0 | 0 | 0 | 0.|

It is especially preferable to use the following 7-, 10- or 15-sequence groups: 21, 23, 25, 26, 30, 31, 32 or 5, 16, 18, 19, 21, 23, 26, 30, 31, 32 or 2, 3, 4, 5, 8, 10, 16, 21, 23, 25, 26, 28, 29, 30, 31, since in such a case for example the cross-correlations are optimised.

It is also preferable to use the following binary sequences in the method according to the invention:

| 1  | 0 | 0 | 0 | 0 | 0 | 0 | 1 | 0 | 1 | 1 | 0 | 0 | 1 | 1 | 1 | 0 | 1 | 0 | 1 | 1 |
|----|---|---|---|---|---|---|---|---|---|---|---|---|---|---|---|---|---|---|---|---|
| 2  | 0 | 0 | 0 | 0 | 0 | 0 | 1 | 1 | 0 | 1 | 0 | 1 | 1 | 1 | 0 | 0 | 1 | 1 | 0 | 1 |
| 3  | 0 | 0 | 0 | 0 | 0 | 1 | 0 | 0 | 0 | 1 | 1 | 0 | 1 | 1 | 0 | 1 | 0 | 1 | 1 | 1 |
| 4  | 0 | 0 | 0 | 0 | 0 | 1 | 0 | 0 | 1 | 0 | 1 | 0 | 0 | 0 | 1 | 0 | 0 | 1 | 1 | 1 |
| 5  | 0 | 0 | 0 | 0 | 0 | 1 | 0 | 0 | 1 | 0 | 1 | 1 | 1 | 0 | 0 | 1 | 1 | 1 | 0 | 1 |
| 6  | 0 | 0 | 0 | 0 | 0 | 1 | 0 | 0 | 1 | 1 | 0 | 0 | 0 | 1 | 0 | 1 | 0 | 1 | 1 |   |
| 7  | 0 | 0 | 0 | 0 | 0 | 1 | 0 | 1 | 1 | 0 | 1 | 0 | 0 | 0 | 1 | 0 | 0 | 0 | 1 | 1 |
| 8  | 0 | 0 | 0 | 0 | 0 | 1 | 0 | 1 | 1 | 1 | 0 | 0 | 1 | 1 | 1 | 0 | 1 | 0 | 0 | 1 |
| 9  | 0 | 0 | 0 | 0 | 0 | 1 | 1 | 0 | 0 | 0 | 1 | 0 | 0 | 0 | 1 | 0 | 1 | 1 | 0 | 1 |
| 10 | 0 | 0 | 0 | 0 | 0 | 1 | 1 | 0 | 1 | 0 | 1 | 0 | 0 | 0 | 0 | 1 | 1 | 0 | 0 | 1 |
| 11 | 0 | 0 | 0 | 0 | 0 | 1 | 1 | 1 | 0 | 0 | 1 | 0 | 0 | 0 | 1 | 0 | 1 | 0 | 0 | 1 |
| 12 | 0 | 0 | 0 | 0 | 0 | 1 | 1 | 1 | 1 | 0 | 1 | 0 | 1 | 1 | 0 | 1 | 1 | 0 | 0 | 1 |
| 13 | 0 | 0 | 0 | 0 | 1 | 0 | 0 | 0 | 1 | 0 | 0 | 1 | 1 | 0 | 1 | 0 | 1 | 1 | 1 | 1 |
| 14 | 0 | 0 | 0 | 0 | 1 | 0 | 0 | 0 | 1 | 0 | 1 | 1 | 0 | 0 | 1 | 1 | 1 | 1 | 0 | 1 |
| 15 | 0 | 0 | 0 | 0 | 1 | 0 | 0 | 0 | 1 | 0 | 1 | 1 | 1 | 1 | 0 | 0 | 1 | 1 | 0 | 1 |
| 16 | 0 | 0 | 0 | 0 | 1 | 0 | 0 | 0 | 1 | 0 | 1 | 1 | 1 | 1 | 0 | 1 | 0 | 0 | 1 | 1 |
| 17 | 0 | 0 | 0 | 0 | 1 | 0 | 0 | 1 | 0 | 1 | 1 | 1 | 1 | 0 | 0 | 0 | 1 | 0 | 1 | 1 |
| 18 | 0 | 0 | 0 | 0 | 1 | 0 | 0 | 1 | 1 | 0 | 1 | 1 | 1 | 0 | 1 | 0 | 1 | 1 | 1 | 1 |
| 19 | 0 | 0 | 0 | 0 | 1 | 0 | 1 | 0 | 0 | 1 | 1 | 0 | 1 | 1 | 1 | 0 | 1 | 1 | 1 | 1 |
| 20 | 0 | 0 | 0 | 0 | 1 | 0 | 1 | 1 | 0 | 0 | 1 | 1 | 1 | 0 | 0 | 1 | 0 | 0 | 0 | 1 |
| 21 | 0 | 0 | 0 | 0 | 1 | 0 | 1 | 1 | 1 | 0 | 1 | 1 | 1 | 1 | 0 | 0 | 1 | 1 | 0 | 1 |
| 22 | 0 | 0 | 0 | 0 | 1 | 0 | 1 | 1 | 1 | 1 | 0 | 0 | 1 | 1 | 0 | 1 | 0 | 0 | 0 | 1. | in turn preferable to use the following sequences of the aforementioned sequences: 2, 3, 4, 6, 7, 9, 10, 11, 12, 14, 16, 17, 18, 19, 20, due to their low cross-correlation.

It is further preferable to use the following binary sequences:

| 1  | 0 | 1 | 1 | 0 | 0 | 1 | 0 | 0 | 0 | 0 | 1 | 1 | 1 | 1 | 0 | 1 | 0 | 1 | 0 | 0 |
|----|---|---|---|---|---|---|---|---|---|---|---|---|---|---|---|---|---|---|---|---|
| 2  | 0 | 0 | 1 | 1 | 1 | 1 | 0 | 1 | 1 | 1 | 1 | 0 | 1 | 0 | 1 | 1 | 0 | 0 | 1 | 0 |
| 3  | 0 | 1 | 0 | 0 | 0 | 0 | 1 | 1 | 0 | 1 | 1 | 0 | 0 | 0 | 1 | 0 | 1 | 0 | 0 | 1 |
| 4  | 1 | 0 | 1 | 0 | 0 | 0 | 0 | 1 | 0 | 0 | 1 | 1 | 1 | 1 | 0 | 0 | 1 | 1 | 1 | 0 |
| 5  | 1 | 1 | 0 | 0 | 1 | 0 | 0 | 1 | 0 | 1 | 0 | 0 | 1 | 0 | 0 | 1 | 1 | 1 | 0 |   |
| 6  | 1 | 0 | 1 | 0 | 1 | 1 | 1 | 1 | 0 | 1 | 1 | 1 | 1 | 0 | 1 | 0 | 0 | 1 | 1 |   |
| 7  | 1 | 1 | 0 | 0 | 1 | 0 | 1 | 0 | 1 | 1 | 1 | 0 | 1 | 1 | 0 | 0 | 0 | 0 | 0 |   |
| 8  | 0 | 0 | 0 | 1 | 0 | 0 | 0 | 1 | 0 | 0 | 1 | 0 | 0 | 0 | 0 | 1 | 1 | 1 |   |   |
| 9  | 1 | 0 | 0 | 1 | 1 | 0 | 0 | 1 | 1 | 1 | 1 | 1 | 0 | 0 | 1 | 1 | 0 | 1 | 0 |   |
| 10 | 0 | 1 | 1 | 1 | 0 | 0 | 0 | 1 | 0 | 1 | 1 | 0 | 0 | 1 | 0 | 0 | 0 | 0 | 0 | 0, | following sequences having the most suitable cross-correlation: 1, 2, 4, 5, 8, 9, 10.

The most typical of the polyphase sequences include the 4-phase sequences. They have slightly less advantageous cross-correlation than the self-orthogonal sequences. The following sequences are suitable as the predetermined sequence in the method according to the invention:

| 1 | 1 | 1 | 1 | 1  | -1 | 1  | 1  | -1 | j  | -1 |
|---|---|---|---|----|----|----|----|----|----|----|
| 2 | 1 | 1 | 1 | 1  | -1 | 1  | 1  | -1 | -j | -1 |
| 3 | 1 | 1 | 1 | 1  | -1 | j  | -1 | 1  | 1  | -1 |
| 4 | 1 | 1 | 1 | 1  | -1 | -j | -1 | 1  | 1  | -1 |
| 5 | 1 | 1 | 1 | j  | 1  | -1 | -j | 1  | -1 | j  |
| 6 | 1 | 1 | 1 | j  | -1 | 1  | j  | 1  | -1 | j  |
| 7 | 1 | 1 | 1 | j  | -1 | 1  | -j | -1 | 1  | j  |
| 8 | 1 | 1 | 1 | j  | -j | 1  | -j | -1 | j  | -j |
| 9 | 1 | 1 | 1 | j  | -j | -1 | j  | 1  | j  | -j |
| 10 | 1 | 1 | 1 | j  | -j | -1 | j  | -1 | -j | j  |
| 11 | 1 | 1 | 1 | -1 | 1  | -1 | -1 | j  | -1 | -1 |
| 12 | 1 | 1 | 1 | -1 | 1  | -1 | -1 | -j | -1 | -1 |
| 13 | 1 | 1 | 1 | -1 | j  | 1  | j  | 1  | j  | -1 |
| 14 | 1 | 1 | 1 | -1 | -1 | j  | -1 | -1 | 1  | -1 |
| 15 | 1 | 1 | 1 | -1 | -j | -1 | -1 | -1 | 1  | -1 |
| 16 | 1 | 1 | 1 | -1 | -j | 1  | -j | 1  | -j | -1 |
| 17 | 1 | 1 | 1 | -j | 1  | -1 | j  | 1  | -1 | -j |
| 18 | 1 | 1 | 1 | -j | j  | 1  | j  | -1 | -j | j  |
| 19 | 1 | 1 | 1 | -j | j  | -1 | -j | 1  | -j | j  |
| 20 | 1 | 1 | 1 | -j | j  | -1 | -1 | -1 | j  | -j |
| 21 | 1 | 1 | 1 | -j | -1 | 1  | j  | -1 | 1  | -j |
| 22 | 1 | 1 | 1 | -j | -1 | 1  | -j | 1  | -1 | -j |
| 23 | 1 | 1 | j | 1  | 1  | -j | -1 | 1  | -1 | -j |
| 24 | 1 | 1 | j | 1  | -1 | 1  | J  | -1 | -1 | j  |
| 25 | 1 | 1 | j | 1  | -j | -1 | -1 | -j | j  | -j |
| 26 | 1 | 1 | j | -1 | 1  | -1 | j  | 1  | 1  | -j |

-continued

| | | | | | | | | | |
|---|---|---|---|---|---|---|---|---|---|
| 27 | 1 | 1 | j | -1 | 1 | -1 | j | -1 | -1 | j |
| 28 | 1 | 1 | j | -1 | j | 1 | 1 | j | -j | j |
| 29 | 1 | 1 | j | -1 | j | -1 | j | 1 | 1 | -1 |
| 30 | 1 | 1 | j | -1 | -1 | j | 1 | -1 | 1 | j |
| 31 | 1 | 1 | j | -1 | -1 | j | -1 | 1 | -1 | j |
| 32 | 1 | 1 | j | -1 | -j | -1 | -1 | j | -j | j |
| 33 | 1 | 1 | j | -j | j | -1 | -1 | j | 1 | -j |
| 34 | 1 | 1 | -1 | 1 | 1 | -j | -1 | -j | -1 | -j |
| 35 | 1 | 1 | -j | 1 | j | -1 | -1 | j | -j | j |
| 36 | 1 | 1 | -j | j | -j | 1 | 1 | -j | -1 | -j |

The following 7-, 10- or 15-sequence groups are particularly advantageous among the aforementioned sequences: 8, 10, 13, 16, 19, 24, 34 or 2, 3, 6, 11, 13, 14, 20, 24, 29, 36 or 4, 7, 12, 15, 16, 18, 20, 22, 23, 24, 26, 29, 31, 34, 36.

The 16-symbol sequences of the self-orthogonal sequences are approximately as good as the binary sequences. In the method according to the invention, the predetermined sequence 12 preferably comprises the following orthogonal sequences:

The most suitable of these include the following 7-, 10- or 15-sequence groups: 2, 8, 24, 28, 30, 35, 41 or 2, 8, 17, 21, 24, 28, 29, 35, 37, 39 or 7, 10, 12, 18, 19, 20, 25, 29, 31, 35, 39, 41, 44, 45, 47.

The digital signal-processing means of the receiver arrangements according to the invention can be implemented by means of a microprocessor with VLSI circuits or ASICs, for example, where the method according to the invention can be realized by means of software.

The arrangement according to the invention can naturally also be implemented by means of other algorithms and formulas that are at least approximately similar and that are substantially equivalent mathematically.

Even though the invention is described above with reference to the example according to the accompanying drawings, it is clear that the invention is not restricted thereto but it can be modified in several ways within the scope of the inventive idea disclosed in the appended claims.

What is claimed is:

1. A method for determining strength of co-channel signals, the method being used in a digital radio system comprising several base stations and subscriber terminals, which operate as transmitters and receivers for signals that

| | | | | | | | | | | | | | | | | |
|---|---|---|---|---|---|---|---|---|---|---|---|---|---|---|---|---|
| 1 | 1 | 1 | 1 | 1 | 1 | j | -1 | -j | 1 | -1 | 1 | -1 | 1 | -j | -1 | j |
| 2 | 1 | 1 | 1 | 1 | 1 | j | -j | -1 | 1 | -1 | -1 | 1 | 1 | -j | j | -1 |
| 3 | 1 | 1 | 1 | 1 | 1 | -1 | j | -j | 1 | 1 | -1 | -1 | 1 | -1 | -j | j |
| 4 | 1 | 1 | 1 | 1 | j | 1 | -1 | -j | -1 | 1 | 1 | -1 | -j | 1 | -1 | j |
| 5 | 1 | 1 | 1 | 1 | j | -1 | 1 | -j | -1 | 1 | 1 | -1 | -j | -1 | 1 | j |
| 6 | 1 | 1 | 1 | 1 | j | 1 | -j | -1 | -1 | 1 | -1 | 1 | -j | 1 | j | -1 |
| 7 | 1 | 1 | 1 | 1 | j | -j | 1 | -1 | -1 | -1 | 1 | 1 | -j | j | 1 | -1 |
| 8 | 1 | 1 | 1 | 1 | -1 | 1 | j | -j | 1 | 1 | -1 | -1 | -1 | 1 | -j | j |
| 9 | 1 | 1 | 1 | 1 | -1 | j | 1 | -j | 1 | 1 | -1 | -1 | -j | 1 | 1 | j |
| 10 | 1 | 1 | 1 | j | 1 | j | -1 | 1 | 1 | -1 | 1 | -j | 1 | -j | -1 | -1 |
| 11 | 1 | 1 | 1 | j | 1 | j | -j | -j | 1 | -1 | -1 | j | 1 | -j | j | -j |
| 12 | 1 | 1 | 1 | j | 1 | -j | j | -j | 1 | -1 | -1 | j | 1 | j | -j | -j |
| 13 | 1 | 1 | 1 | j | j | 1 | -1 | 1 | 1 | 1 | -j | -j | 1 | -1 | -1 |
| 14 | 1 | 1 | 1 | j | j | 1 | -j | -j | -1 | 1 | -1 | j | -j | 1 | j | -j |
| 15 | 1 | 1 | 1 | j | j | -1 | 1 | -1 | 1 | 1 | -j | -j | -1 | 1 | -1 |
| 16 | 1 | 1 | 1 | j | j | -1 | -j | j | -1 | 1 | -1 | j | -j | -1 | j | j |
| 17 | 1 | 1 | 1 | j | j | -j | 1 | -j | -1 | 1 | 1 | j | -j | j | 1 | -j |
| 18 | 1 | 1 | 1 | j | j | -j | j | -1 | -1 | -1 | 1 | 1 | j | -j | j | -1 | j |
| 19 | 1 | 1 | 1 | j | -1 | 1 | j | 1 | 1 | -1 | -j | -1 | 1 | -j | -1 |
| 20 | 1 | 1 | 1 | j | -1 | j | -j | j | 1 | -1 | -1 | j | -1 | -j | j | j |
| 21 | 1 | 1 | 1 | j | -1 | -j | j | j | 1 | -1 | -1 | j | -1 | j | -j | j |
| 22 | 1 | 1 | 1 | j | -j | 1 | j | -1 | 1 | -1 | 1 | j | j | 1 | -j | -j |
| 23 | 1 | 1 | 1 | j | -j | j | 1 | -j | -1 | -1 | 1 | j | j | -j | 1 | -j |
| 24 | 1 | 1 | 1 | J | -J | J | -1 | J | -1 | -1 | 1 | J | J | -J | -1 | j |
| 25 | 1 | 1 | 1 | j | -j | -1 | j | j | -1 | 1 | -1 | j | j | -1 | -j | j |
| 26 | 1 | 1 | 1 | j | -1 | j | 1 | 1 | 1 | -j | -1 | -j | -1 | 1 | -1 |
| 27 | 1 | 1 | 1 | -1 | 1 | -1 | j | 1 | 1 | -1 | 1 | 1 | -1 | -j | 1 |
| 28 | 1 | 1 | 1 | j | 1 | -1 | j | 1 | 1 | -1 | -j | 1 | -1 | -j | -1 |
| 29 | 1 | 1 | 1 | -1 | j | -1 | -j | -1 | 1 | -1 | -1 | -j | -1 | j | -1 |
| 30 | 1 | 1 | 1 | -1 | -1 | 1 | j | j | 1 | -1 | 1 | 1 | 1 | -j | -j |
| 31 | 1 | 1 | 1 | -1 | -1 | j | 1 | 1 | -1 | 1 | 1 | -1 | -j | 1 | -j |
| 32 | 1 | 1 | j | 1 | 1 | j | 1 | -1 | 1 | -1 | -j | 1 | 1 | -j | -1 | -1 |
| 33 | 1 | 1 | j | 1 | 1 | j | -j | -j | 1 | -1 | j | -1 | 1 | -j | -j | j |
| 34 | 1 | 1 | j | 1 | 1 | -1 | j | 1 | 1 | -j | -1 | 1 | -1 | -1 | -j |
| 35 | 1 | 1 | j | 1 | 1 | -1 | -1 | -j | 1 | 1 | -j | -1 | 1 | -1 | 1 | j |
| 36 | 1 | 1 | j | 1 | 1 | -j | -1 | -1 | 1 | -1 | -j | 1 | 1 | j | 1 | -1 |
| 37 | 1 | 1 | j | 1 | -1 | -j | -j | j | 1 | -1 | j | -1 | 1 | j | -j | -j |
| 38 | 1 | 1 | j | 1 | j | 1 | -j | -j | -1 | 1 | j | -1 | -j | 1 | -j | j |
| 39 | 1 | 1 | j | 1 | j | 1 | -1 | -1 | 1 | -j | j | -1 | 1 | -j | -1 | -1 |
| 40 | 1 | 1 | j | 1 | j | -1 | -j | -j | 1 | -1 | -j | -1 | j | j |
| 41 | 1 | 1 | j | 1 | -1 | -j | j | j | 1 | -1 | -1 | j | j | -j |
| 42 | 1 | 1 | j | 1 | -j | 1 | -j | j | -1 | 1 | -j | j | 1 | -j | -j |
| 43 | 1 | 1 | j | 1 | -j | -1 | j | -1 | 1 | -j | j | -1 | j | -j |
| 44 | 1 | 1 | j | -1 | -1 | j | -1 | 1 | 1 | -j | -1 | j | -j |
| 45 | 1 | 1 | j | -1 | -j | 1 | -j | -j | -1 | 1 | j | j | 1 | -j | j |
| 46 | 1 | 1 | j | j | 1 | -j | -1 | -j | 1 | -1 | -j | j | 1 | j | 1 | -j |
| 47 | 1 | 1 | j | j | -1 | -j | -1 | j | 1 | -1 | -j | j | -1 | j | 1 | j |
| 48 | 1 | 1 | j | 1 | -1 | j | j | -j | 1 | -1 | j | -1 | -1 | -j | j | j | are desired signals and/or interference signals and that propagate in channels and that comprise at least one predetermined sequence characteristic of the transmitter, the signals being sampled when they are received, wherein forming subsets of predetermined sequences from the predetermined sequences related to the signals to be received, performing channel estimation separately for each subset based on the samples of the received co-channel signals and the subsets formed, and a channel estimate related to each subset being formed as a result of the estimation, and forming, by means of the channel estimate, an estimate signal for the subset, the signal being compared to the received signal, and forming, by means of said comparison, a strength estimate that describes the strength of at least one signal of the subset and that is used to select at least one subset with the greatest signal strength.

2. A method for determining strength of co-channel signals, the method being used in a digital radio system comprising several base stations and subscriber terminals, which operate as transmitters and receivers for signals that are desired signals and/or interference signals and that propagate in channels and that comprise at least one predetermined sequence characteristic of the transmitter, the receivers comprising diversity branches, wherein forming subsets of predetermined sequences from the predetermined sequences related to the signals to be received, performing channel estimation separately for each subset based on the samples of the received co-channel signals and the subsets formed, and a channel estimate related to each subset being formed as a result of the estimation, and forming, by means of the channel estimate, an estimate signal for the subset, the estimate being compared to the received signal, and forming, by means of said comparison, a strength estimate that describes the strength of at least one signal of the subset and that is used when at least one subset with the greatest signal strength is selected, and forming from the channel estimates a correlation result between the diversity branches, the result being used to decrease the amount of interference.

3. A method according to claim 2, wherein the correlation result is formed substantially of only the channel estimates of the interference signal and/or the desired signal.

4. A method according to claim 1, wherein when the channel estimate comprises taps, the strength estimate of the subset signals is determined such that a sum is formed of the channel estimate taps to locate the subsets with the strongest signals, and said strength estimates are used to decrease the amount of interference.

5. A method according to claim 1, wherein each subset of the receiver comprises at least one identical predetermined sequence that is preferably the predetermined sequence of the signal of the transmitter in the actual coverage area of which the receiver is located.

6. A method according to claim 1, wherein the receiver carries out the channel estimation such that each subset comprises substantially only the predetermined sequence of the signal of the transmitter in the actual coverage area of which the receiver is located, and the predetermined sequence of one other signal.

7. A method according to claim 1, wherein sequences outside the subset are assumed to be noise.

8. A method according to claim 1, wherein the channel estimation is carried out by utilizing maximum likelihood type formation of a channel estimate.

9. A method according to claim 1, wherein when the radio system is a GSM system, the predetermined sequence is a training sequence of the GSM system.

10. A method according to claim 1, wherein the predetermined sequence comprises the following binary sequences

| | | | | | | | | | | | | | | | | | | | | | |
|---|---|---|---|---|---|---|---|---|---|---|---|---|---|---|---|---|---|---|---|---|---|
| 1  | 0 | 0 | 0 | 0 | 0 | 0 | 1 | 0 | 1 | 1 | 0 | 0 | 1 | 1 | 1 | 0 | 0 | 0 | 1 | 1 |
| 2  | 0 | 0 | 0 | 0 | 0 | 0 | 1 | 1 | 0 | 1 | 0 | 1 | 1 | 1 | 0 | 0 | 1 | 1 | 0 | 1 |
| 3  | 0 | 0 | 0 | 0 | 1 | 0 | 0 | 0 | 1 | 1 | 0 | 1 | 1 | 0 | 1 | 1 | 0 | 1 | 1 | 1 |
| 4  | 0 | 0 | 0 | 0 | 1 | 0 | 0 | 1 | 0 | 1 | 0 | 0 | 0 | 1 | 0 | 0 | 1 | 1 | 1 | 1 |
| 5  | 0 | 0 | 0 | 0 | 1 | 0 | 0 | 1 | 0 | 1 | 1 | 1 | 0 | 0 | 1 | 1 | 1 | 0 | 1 |
| 6  | 0 | 0 | 0 | 0 | 1 | 0 | 0 | 1 | 1 | 0 | 0 | 0 | 0 | 1 | 0 | 1 | 0 | 1 | 1 |
| 7  | 0 | 0 | 0 | 0 | 1 | 0 | 1 | 1 | 0 | 1 | 0 | 0 | 0 | 1 | 0 | 0 | 0 | 1 | 1 |
| 8  | 0 | 0 | 0 | 0 | 1 | 0 | 1 | 1 | 1 | 0 | 0 | 1 | 1 | 1 | 0 | 1 | 0 | 0 | 1 |
| 9  | 0 | 0 | 0 | 0 | 1 | 1 | 0 | 0 | 0 | 1 | 0 | 0 | 0 | 1 | 0 | 1 | 1 | 0 | 1 |
| 10 | 0 | 0 | 0 | 0 | 1 | 1 | 0 | 1 | 0 | 1 | 0 | 0 | 0 | 0 | 1 | 1 | 0 | 0 | 1 |
| 11 | 0 | 0 | 0 | 0 | 1 | 1 | 1 | 0 | 0 | 1 | 0 | 0 | 0 | 1 | 0 | 1 | 0 | 0 | 1 |
| 12 | 0 | 0 | 0 | 0 | 1 | 1 | 1 | 0 | 1 | 0 | 1 | 0 | 1 | 1 | 1 | 0 | 0 | 0 | 1 |
| 13 | 0 | 0 | 0 | 1 | 0 | 0 | 0 | 1 | 0 | 0 | 1 | 1 | 0 | 1 | 0 | 1 | 1 | 1 | 1 |
| 14 | 0 | 0 | 0 | 1 | 0 | 0 | 0 | 1 | 0 | 1 | 1 | 0 | 0 | 1 | 1 | 1 | 1 | 0 | 1 |
| 15 | 0 | 0 | 0 | 1 | 0 | 0 | 0 | 1 | 0 | 1 | 1 | 1 | 1 | 0 | 0 | 1 | 1 | 0 | 1 |
| 16 | 0 | 0 | 0 | 1 | 0 | 0 | 0 | 1 | 1 | 0 | 1 | 1 | 1 | 0 | 1 | 0 | 0 | 1 | 1 |
| 17 | 0 | 0 | 0 | 1 | 0 | 0 | 1 | 1 | 0 | 1 | 1 | 1 | 1 | 0 | 0 | 0 | 1 | 0 | 1 |
| 18 | 0 | 0 | 0 | 1 | 0 | 0 | 1 | 1 | 0 | 1 | 1 | 1 | 1 | 0 | 1 | 0 | 1 | 1 | 1 |
| 19 | 0 | 0 | 0 | 1 | 0 | 1 | 0 | 0 | 1 | 1 | 0 | 1 | 1 | 1 | 0 | 1 | 1 | 1 | 1 |
| 20 | 0 | 0 | 0 | 1 | 0 | 1 | 0 | 0 | 1 | 1 | 1 | 1 | 1 | 0 | 1 | 0 | 0 | 0 | 1 |
| 21 | 0 | 0 | 0 | 1 | 0 | 1 | 1 | 1 | 0 | 1 | 1 | 1 | 1 | 0 | 0 | 1 | 1 | 0 | 1 |
| 22 | 0 | 0 | 0 | 1 | 0 | 1 | 1 | 1 | 1 | 0 | 0 | 1 | 1 | 0 | 1 | 0 | 0 | 0 | 1 | the following sequences being used most preferably: 2, 3, 4, 6, 7, 9, 10, 11, 12, 14, 16, 17, 18, 19, 20.

11. A method according to claim 1, wherein the predetermined sequence comprises the following binary sequences

| | | | | | | | | | | | | | | | | | | | | |
|---|---|---|---|---|---|---|---|---|---|---|---|---|---|---|---|---|---|---|---|---|
| 1 | 0 | 1 | 1 | 0 | 0 | 1 | 0 | 0 | 0 | 0 | 1 | 1 | 1 | 1 | 0 | 1 | 0 | 1 | 0 | 0 |
| 2 | 0 | 0 | 1 | 1 | 1 | 1 | 0 | 1 | 1 | 1 | 1 | 0 | 1 | 0 | 1 | 1 | 0 | 0 | 1 | 0 |
| 3 | 0 | 1 | 0 | 0 | 0 | 0 | 1 | 1 | 0 | 1 | 1 | 0 | 0 | 0 | 1 | 0 | 1 | 0 | 0 | 1 |
| 4 | 1 | 0 | 1 | 0 | 0 | 0 | 0 | 0 | 1 | 0 | 0 | 1 | 1 | 1 | 1 | 0 | 0 | 1 | 1 | 0 |
| 5 | 1 | 1 | 0 | 0 | 1 | 0 | 0 | 1 | 0 | 1 | 0 | 0 | 0 | 1 | 0 | 0 | 1 | 1 | 1 | 0 |
| 6 | 1 | 0 | 1 | 0 | 1 | 1 | 1 | 1 | 1 | 0 | 1 | 1 | 1 | 1 | 0 | 1 | 0 | 0 | 1 | 1 |
| 7 | 1 | 1 | 0 | 0 | 1 | 0 | 1 | 0 | 1 | 1 | 1 | 1 | 0 | 1 | 1 | 0 | 0 | 0 | 0 | 0 |
| 8 | 0 | 0 | 0 | 1 | 0 | 0 | 0 | 1 | 0 | 0 | 1 | 0 | 1 | 0 | 0 | 0 | 0 | 1 | 1 | 1 |
| 9 | 1 | 0 | 0 | 1 | 1 | 0 | 0 | 1 | 1 | 1 | 1 | 1 | 1 | 0 | 0 | 1 | 1 | 0 | 1 | 0 |
| 10 | 0 | 1 | 1 | 1 | 0 | 0 | 0 | 1 | 0 | 1 | 1 | 0 | 0 | 1 | 0 | 0 | 0 | 0 | 0 | 0 | the following sequences being used most, preferably: 1, 2, 4, 5, 8, 9, 10.

12. A method according to claim 1, wherein the predetermined sequence comprises the following Gold sequences:

| | | | | | | | | | | | | | | | | | | |
|---|---|---|---|---|---|---|---|---|---|---|---|---|---|---|---|---|---|---|
| 1 | 0 | 0 | 0 | 1 | 1 | 0 | 1 | 1 | 1 | 1 | 0 | 1 | 1 | 0 | 1 | 0 | 0 | 1 |
| 2 | 1 | 1 | 0 | 0 | 0 | 1 | 1 | 0 | 0 | 1 | 1 | 1 | 1 | 1 | 1 | 0 | 0 | 0 | 1 |
| 3 | 0 | 1 | 1 | 1 | 1 | 0 | 1 | 0 | 1 | 0 | 1 | 1 | 0 | 0 | 0 | 0 | 0 | 0 |
| 4 | 0 | 0 | 0 | 0 | 0 | 1 | 1 | 0 | 0 | 0 | 1 | 0 | 1 | 0 | 0 | 0 | 0 | 1 | 0 |
| 5 | 1 | 1 | 1 | 1 | 1 | 1 | 1 | 1 | 0 | 0 | 0 | 1 | 1 | 0 | 0 | 0 | 1 | 1 | 1 |
| 6 | 0 | 0 | 0 | 0 | 1 | 1 | 1 | 0 | 1 | 0 | 1 | 1 | 1 | 0 | 0 | 1 | 1 | 0 | 0 |
| 7 | 1 | 1 | 1 | 0 | 1 | 0 | 0 | 1 | 1 | 0 | 1 | 1 | 1 | 0 | 1 | 1 | 0 | 1 | 0 |
| 8 | 0 | 1 | 0 | 0 | 0 | 0 | 0 | 0 | 1 | 1 | 1 | 1 | 1 | 0 | 1 | 1 | 1 |
| 9 | 1 | 0 | 1 | 1 | 0 | 0 | 1 | 1 | 0 | 0 | 1 | 1 | 0 | 1 | 0 | 1 | 1 | 0 | 1 |
| 10 | 1 | 0 | 0 | 1 | 0 | 1 | 0 | 1 | 0 | 0 | 0 | 0 | 1 | 1 | 0 | 0 | 0 | 0 |
| 11 | 1 | 1 | 0 | 1 | 1 | 0 | 0 | 1 | 0 | 0 | 0 | 0 | 1 | 1 | 1 | 0 | 0 | 1 | 0 |
| 12 | 0 | 1 | 0 | 0 | 0 | 0 | 0 | 1 | 0 | 1 | 0 | 1 | 0 | 1 | 0 | 0 | 1 | 1 | 0 |
| 13 | 0 | 1 | 1 | 1 | 0 | 0 | 0 | 1 | 1 | 1 | 1 | 0 | 0 | 0 | 0 | 1 | 1 | 1 | 0 |
| 14 | 0 | 0 | 0 | 1 | 0 | 0 | 0 | 0 | 1 | 0 | 0 | 0 | 0 | 1 | 0 | 1 | 1 | 1 | 1 |
| 15 | 1 | 1 | 0 | 1 | 0 | 0 | 1 | 0 | 0 | 1 | 0 | 1 | 1 | 1 | 1 | 1 | 1 | 0 | 0 |
| 16 | 0 | 1 | 0 | 1 | 0 | 1 | 1 | 1 | 1 | 1 | 1 | 1 | 0 | 1 | 1 | 1 | 0 | 1 | 1 |
| 17 | 0 | 1 | 0 | 1 | 1 | 1 | 0 | 0 | 1 | 0 | 1 | 0 | 0 | 1 | 1 | 0 | 1 | 0 | 1 |
| 18 | 0 | 1 | 0 | 0 | 0 | 1 | 0 | 1 | 0 | 0 | 0 | 0 | 0 | 1 | 0 | 1 | 0 | 0 | 0 |
| 19 | 0 | 1 | 1 | 0 | 0 | 1 | 1 | 1 | 0 | 1 | 0 | 0 | 0 | 0 | 1 | 0 | 0 | 1 | 1 |
| 20 | 0 | 0 | 1 | 1 | 1 | 1 | 0 | 1 | 1 | 1 | 0 | 0 | 1 | 1 | 0 | 0 | 1 | 0 | 0 |
| 21 | 1 | 0 | 0 | 0 | 1 | 0 | 0 | 0 | 1 | 1 | 0 | 1 | 0 | 0 | 0 | 1 | 0 | 1 | 1 |
| 22 | 1 | 1 | 1 | 0 | 0 | 0 | 1 | 0 | 1 | 1 | 1 | 0 | 1 | 0 | 1 | 0 | 1 | 0 | 0 |
| 23 | 0 | 0 | 1 | 1 | 0 | 1 | 1 | 0 | 1 | 0 | 0 | 1 | 1 | 0 | 1 | 0 | 1 | 0 |
| 24 | 1 | 0 | 0 | 1 | 1 | 1 | 1 | 0 | 0 | 1 | 1 | 1 | 0 | 0 | 1 | 0 | 1 | 1 | 0 |
| 25 | 1 | 1 | 0 | 0 | 1 | 1 | 1 | 1 | 1 | 0 | 1 | 0 | 1 | 1 | 0 | 1 | 1 | 1 | 1 |
| 26 | 0 | 1 | 1 | 0 | 1 | 1 | 0 | 0 | 0 | 0 | 1 | 0 | 0 | 1 | 1 | 1 | 0 | 1 |
| 27 | 0 | 0 | 1 | 0 | 1 | 0 | 1 | 1 | 0 | 1 | 1 | 0 | 1 | 1 | 1 | 0 | 0 | 0 | 1 |
| 28 | 1 | 0 | 1 | 0 | 0 | 1 | 0 | 1 | 1 | 0 | 0 | 1 | 0 | 1 | 1 | 0 | 0 | 0 | 0 |
| 29 | 1 | 0 | 1 | 1 | 1 | 0 | 0 | 0 | 1 | 1 | 0 | 0 | 1 | 0 | 0 | 0 | 1 | 1 |
| 30 | 1 | 0 | 0 | 0 | 0 | 0 | 1 | 1 | 1 | 0 | 0 | 0 | 0 | 0 | 0 | 1 | 0 | 1 |
| 31 | 1 | 1 | 1 | 1 | 1 | 0 | 1 | 0 | 0 | 0 | 0 | 1 | 0 | 0 | 0 | 1 | 0 | 0 | 1 |
| 32 | 1 | 0 | 1 | 0 | 1 | 1 | 1 | 0 | 1 | 1 | 0 | 0 | 0 | 1 | 1 | 1 | 1 | 1 | 0 |
| 33 | 1 | 0 | 1 | 1 | 0 | 1 | 0 | 1 | 0 | 0 | 0 | 1 | 1 | 1 | 0 | 1 | 1 | 1 | 1 |

| | | | | | | | | | | | |
|---|---|---|---|---|---|---|---|---|---|---|---|
| 1 | 1 | 1 | 1 | 1 | 1 | 0 | 1 | 0 | 0 | 0 | 0 |
| 2 | 0 | 1 | 0 | 0 | 1 | 1 | 1 | 1 | 0 | 0 | 1 |
| 3 | 0 | 0 | 1 | 0 | 0 | 1 | 0 | 1 | 0 | 0 | 1 | 0 |
| 4 | 1 | 1 | 1 | 1 | 0 | 0 | 0 | 1 | 0 | 1 | 0 | 1 |
| 5 | 0 | 1 | 0 | 1 | 1 | 0 | 0 | 1 | 1 | 0 | 1 | 1 |
| 6 | 0 | 0 | 0 | 0 | 1 | 0 | 0 | 0 | 0 | 1 | 1 | 0 |
| 7 | 1 | 0 | 1 | 0 | 1 | 0 | 1 | 1 | 1 | 1 | 0 | 1 |
| 8 | 1 | 1 | 1 | 0 | 1 | 1 | 0 | 0 | 1 | 0 | 1 | 0 |
| 9 | 0 | 1 | 1 | 0 | 0 | 0 | 1 | 0 | 0 | 1 | 0 | 1 |
| 10 | 0 | 1 | 1 | 1 | 1 | 1 | 1 | 1 | 1 | 0 | 1 | 0 |
| 11 | 0 | 1 | 0 | 0 | 0 | 1 | 0 | 0 | 0 | 1 | 0 | 0 |
| 12 | 0 | 0 | 1 | 1 | 0 | 0 | 1 | 1 | 1 | 0 | 0 | 0 |
| 13 | 1 | 0 | 1 | 1 | 1 | 0 | 0 | 0 | 0 | 0 | 1 |
| 14 | 0 | 0 | 0 | 0 | 0 | 0 | 1 | 1 | 0 | 0 | 1 | 1 |
| 15 | 1 | 0 | 1 | 1 | 1 | 1 | 0 | 1 | 0 | 1 | 1 | 1 |
| 16 | 1 | 0 | 0 | 0 | 0 | 0 | 1 | 1 | 1 | 1 | 0 |
| 17 | 0 | 0 | 1 | 1 | 1 | 0 | 0 | 0 | 1 | 1 | 0 | 1 |
| 18 | 1 | 0 | 0 | 1 | 0 | 1 | 0 | 1 | 0 | 1 | 1 |
| 19 | 0 | 0 | 1 | 0 | 1 | 1 | 1 | 0 | 0 | 1 | 1 | 1 |
| 20 | 1 | 1 | 1 | 0 | 0 | 1 | 1 | 1 | 1 | 1 | 1 | 1 |
| 21 | 0 | 1 | 1 | 1 | 0 | 1 | 0 | 0 | 1 | 1 | 1 | 1 |
| 22 | 0 | 1 | 0 | 1 | 0 | 0 | 1 | 0 | 1 | 1 | 1 | 0 |
| 23 | 0 | 0 | 0 | 1 | 1 | 1 | 1 | 0 | 1 | 1 | 0 | 0 |
| 24 | 1 | 0 | 0 | 0 | 0 | 1 | 1 | 0 | 1 | 0 | 0 | 1 |

-continued

| | | | | | | | | | | | |
|---|---|---|---|---|---|---|---|---|---|---|---|
| 25 | 1 | 0 | 1 | 1 | 0 | 1 | 1 | 0 | 0 | 0 | 1 | 0 |
| 26 | 1 | 1 | 0 | 1 | 0 | 1 | 1 | 1 | 0 | 1 | 0 | 0 |
| 27 | 0 | 0 | 0 | 1 | 0 | 1 | 0 | 1 | 1 | 0 | 0 | 1 |
| 28 | 1 | 0 | 0 | 1 | 0 | 0 | 0 | 0 | 0 | 0 | 1 | 1 |
| 29 | 1 | 0 | 0 | 1 | 1 | 0 | 1 | 1 | 0 | 1 | 1 | 0 |
| 30 | 1 | 0 | 0 | 0 | 1 | 1 | 0 | 1 | 1 | 1 | 0 | 0 |
| 31 | 1 | 0 | 1 | 0 | 0 | 0 | 0 | 1 | 0 | 0 | 0 | 0 |
| 32 | 0 | 1 | 1 | 0 | 1 | 0 | 0 | 1 | 0 | 0 | 0 | 0 |
| 33 | 1 | 0 | 0 | 1 | 0 | 0 | 1 | 1 | 0 | 0 | 0 | 0 | the following 7-, 10- or 15-sequence groups being used most preferably: 21, 23, 25, 26, 30, 31, 32 or 5, 16, 18, 19, 21, 23, 26, 30, 31, 32 or 2, 3, 4, 5, 8, 10, 16, 21, 23, 25, 26, 28, 29, 30, 31.

13. A method according to claim 1, wherein the predetermined sequence comprises the following 4-phase sequences:

| | | | | | | | | | | |
|---|---|---|---|---|---|---|---|---|---|---|
| 1 | 1 | 1 | 1 | 1 | -1 | 1 | 1 | -1 | j | -1 |
| 2 | 1 | 1 | 1 | 1 | -1 | 1 | 1 | -1 | -j | -1 |
| 3 | 1 | 1 | 1 | 1 | -1 | j | -1 | 1 | 1 | -1 |
| 4 | 1 | 1 | 1 | 1 | -1 | -j | -1 | 1 | 1 | -1 |
| 5 | 1 | 1 | 1 | j | 1 | -1 | -j | 1 | -1 | j |
| 6 | 1 | 1 | 1 | j | -1 | 1 | j | 1 | -1 | j |
| 7 | 1 | 1 | 1 | j | -1 | 1 | -j | -1 | 1 | j |
| 8 | 1 | 1 | 1 | j | -j | 1 | -j | -1 | j | -j |
| 9 | 1 | 1 | 1 | j | -j | -1 | j | 1 | j | -j |
| 10 | 1 | 1 | 1 | j | -j | -1 | j | -1 | -j | j |
| 11 | 1 | 1 | 1 | -1 | 1 | -1 | -1 | j | -1 | -1 |
| 12 | 1 | 1 | 1 | -1 | 1 | -1 | -1 | -j | -1 | -1 |
| 13 | 1 | 1 | 1 | -1 | j | 1 | j | 1 | j | -1 |
| 14 | 1 | 1 | 1 | -1 | -1 | j | -1 | -1 | 1 | -1 |
| 15 | 1 | 1 | 1 | -1 | -1 | -j | -1 | -1 | 1 | -1 |
| 16 | 1 | 1 | 1 | -1 | -j | 1 | -j | 1 | -j | -1 |
| 17 | 1 | 1 | 1 | -j | 1 | -1 | j | 1 | -1 | -j |
| 18 | 1 | 1 | 1 | -j | j | 1 | j | -1 | -j | j |
| 19 | 1 | 1 | 1 | -j | j | -1 | -j | 1 | -j | j |

-continued

| | | | | | | | | | | |
|---|---|---|---|---|---|---|---|---|---|---|
| 20 | 1 | 1 | 1 | -j | j | -1 | -j | -1 | j | -j |
| 21 | 1 | 1 | 1 | -j | -1 | 1 | j | -1 | 1 | -j |
| 22 | 1 | 1 | 1 | -j | -1 | 1 | -j | 1 | -1 | -j |
| 23 | 1 | 1 | j | 1 | 1 | -j | -1 | 1 | -1 | -j |
| 24 | 1 | 1 | j | 1 | -1 | 1 | J | -1 | -1 | j |
| 25 | 1 | 1 | j | 1 | -j | -1 | -1 | -J | J | -j |
| 26 | 1 | 1 | j | -1 | 1 | -1 | j | 1 | 1 | -j |
| 27 | 1 | 1 | j | -1 | 1 | -1 | j | -1 | -1 | j |
| 28 | 1 | 1 | j | -1 | j | 1 | 1 | j | -j | j |
| 29 | 1 | 1 | j | -1 | j | -1 | j | 1 | 1 | -1 |
| 30 | 1 | 1 | j | -1 | -1 | j | 1 | -1 | 1 | j |
| 31 | 1 | 1 | j | -1 | -1 | j | -1 | 1 | -1 | -j |
| 32 | 1 | 1 | j | -1 | -j | -1 | -1 | j | -j | j |
| 33 | 1 | 1 | j | -j | -1 | 1 | j | 1 | -1 | -j |
| 34 | 1 | 1 | -1 | 1 | 1 | -j | -1 | -j | -1 | -j |
| 35 | 1 | 1 | -j | 1 | j | -1 | -1 | j | -j | j |
| 36 | 1 | 1 | -j | j | -j | 1 | 1 | -j | -1 | -j | the following 7-, 10- or 15-sequence groups being used most preferably: 8, 10, 13, 16, 19, 24, 34 or 2, 3, 6, 11, 13, 14, 20, 24, 29, 36 or 4, 7, 12, 15, 16, 18, 20, 22, 23, 24, 26, 29, 31, 34, 36.

14. A method according to claim 1,
wherein the predetermined sequence comprises the following orthogonal sequences:

| | | | | | | | | | | | | | | | |
|---|---|---|---|---|---|---|---|---|---|---|---|---|---|---|---|
| 1 | 1 | 1 | 1 | 1 | 1 | j | -1 | -j | 1 | -1 | 1 | -1 | 1 | -j | -1 | j |
| 2 | 1 | 1 | 1 | 1 | 1 | j | -j | -1 | 1 | -1 | -1 | 1 | 1 | -j | j | -1 |
| 3 | 1 | 1 | 1 | 1 | -1 | j | -j | 1 | 1 | 1 | -1 | -1 | 1 | -1 | -j | j |
| 4 | 1 | 1 | 1 | 1 | j | 1 | -1 | -j | -1 | 1 | 1 | -1 | -j | 1 | -1 | j |
| 5 | 1 | 1 | 1 | j | -1 | 1 | -j | -1 | 1 | 1 | -1 | -j | -1 | 1 | j |
| 6 | 1 | 1 | 1 | j | 1 | -j | -1 | -1 | 1 | -1 | 1 | -j | 1 | j | -1 |
| 7 | 1 | 1 | 1 | j | -1 | 1 | -1 | -1 | -1 | 1 | 1 | -j | j | 1 | -1 |
| 8 | 1 | 1 | 1 | 1 | -1 | 1 | -j | 1 | 1 | -1 | -1 | 1 | 1 | -j | j |
| 9 | 1 | 1 | 1 | -1 | j | 1 | -j | 1 | -1 | 1 | -1 | -1 | -j | 1 | j |
| 10 | 1 | 1 | j | 1 | j | -1 | 1 | 1 | -1 | 1 | -j | 1 | -j | -1 | -1 |
| 11 | 1 | 1 | 1 | j | 1 | j | -j | -1 | 1 | -1 | -1 | j | 1 | -j | j | -j |
| 12 | 1 | 1 | 1 | j | 1 | -j | j | -j | 1 | -1 | -1 | j | 1 | j | -j | -j |
| 13 | 1 | 1 | 1 | j | j | 1 | -1 | 1 | -1 | 1 | 1 | -j | -j | 1 | -1 | -1 |
| 14 | 1 | 1 | 1 | j | j | 1 | -j | -j | -1 | 1 | -1 | j | -j | 1 | j | -j |
| 15 | 1 | 1 | 1 | j | j | -1 | 1 | 1 | -1 | 1 | 1 | -j | -j | -1 | 1 | -1 |
| 16 | 1 | 1 | 1 | j | j | -1 | -j | -1 | 1 | -1 | 1 | j | -j | -1 | j | j |
| 17 | 1 | 1 | 1 | j | j | -j | 1 | -j | -1 | -1 | 1 | j | -j | j | 1 | -j |
| 18 | 1 | 1 | 1 | j | j | -j | -1 | j | -1 | -1 | 1 | j | -j | j | -1 | j |
| 19 | 1 | 1 | 1 | j | -1 | 1 | j | 1 | 1 | -1 | -j | -1 | 1 | -j | -1 |
| 20 | 1 | 1 | 1 | j | -1 | 1 | -j | j | 1 | -1 | -1 | j | -1 | -j | j | j |
| 21 | 1 | 1 | 1 | j | -1 | -j | j | 1 | -1 | 1 | -1 | -1 | j | -j | j |
| 23 | 1 | 1 | 1 | j | -j | j | 1 | -j | -1 | -1 | 1 | j | j | -j | 1 | -j |
| 24 | 1 | 1 | 1 | j | -j | j | -1 | 1 | -1 | -1 | 1 | j | j | -j | -1 | j |
| 25 | 1 | 1 | 1 | j | -j | -1 | j | 1 | 1 | -1 | 1 | j | j | -1 | 1 | -j |
| 26 | 1 | 1 | 1 | j | -1 | j | 1 | 1 | -1 | 1 | -j | -1 | -j | 1 | -1 |
| 27 | 1 | 1 | -1 | 1 | -1 | j | 1 | 1 | -1 | 1 | 1 | -1 | -j | -j |
| 28 | 1 | 1 | 1 | j | 1 | -1 | j | 1 | 1 | -1 | -j | 1 | -1 | -j | -1 |
| 29 | 1 | 1 | 1 | -1 | j | -1 | -j | -1 | 1 | -1 | -1 | -j | -1 | j | -1 |
| 30 | 1 | 1 | 1 | -1 | -1 | 1 | j | j | 1 | -1 | 1 | -1 | 1 | 1 | -j | -j |
| 31 | 1 | 1 | 1 | -1 | -1 | j | 1 | j | -1 | 1 | -1 | 1 | -j | 1 | -j |

-continued

| | | | | | | | | | | | | | | | | |
|---|---|---|---|---|---|---|---|---|---|---|---|---|---|---|---|---|
| 32 | 1 | 1 | j | 1 | 1 | j | 1 | -1 | 1 | -1 | -j | 1 | 1 | -j | -1 | -1 |
| 33 | 1 | 1 | j | 1 | 1 | j | -j | -j | 1 | -1 | j | -1 | 1 | -j | -j | j |
| 34 | 1 | 1 | j | 1 | 1 | -1 | 1 | j | 1 | 1 | -j | -1 | 1 | -1 | -1 | -j |
| 35 | 1 | 1 | j | 1 | 1 | -1 | -1 | -j | 1 | 1 | -j | -1 | 1 | -1 | 1 | j |
| 36 | 1 | 1 | j | 1 | 1 | -j | -1 | -1 | 1 | -1 | -j | 1 | 1 | j | 1 | -1 |
| 37 | 1 | 1 | j | 1 | 1 | -j | -j | j | 1 | -1 | j | -1 | 1 | j | -j | -j |
| 38 | 1 | 1 | j | 1 | j | 1 | -j | -j | -1 | 1 | j | -1 | -j | 1 | -j | j |
| 39 | 1 | 1 | j | 1 | j | 1 | 1 | -1 | -1 | 1 | -j | 1 | -j | 1 | -1 | -1 |
| 40 | 1 | 1 | j | 1 | j | -1 | j | -j | -1 | 1 | j | -1 | -j | -1 | j | j |
| 41 | 1 | 1 | j | 1 | -1 | -j | j | j | 1 | -1 | j | -1 | -1 | j | j | -j |
| 42 | 1 | 1 | j | 1 | -j | 1 | -j | j | -1 | 1 | j | -1 | j | 1 | -j | -j |
| 43 | 1 | 1 | j | 1 | -j | -1 | j | j | -1 | 1 | j | -1 | -1 | j | j | -j |
| 44 | 1 | 1 | j | -1 | j | -1 | j | j | -1 | 1 | 1 | -j | -1 | j | j | -j |
| 45 | 1 | 1 | j | -1 | -j | 1 | -j | -j | -1 | 1 | j | 1 | j | 1 | -j | j |
| 46 | 1 | 1 | j | j | 1 | -j | -1 | -j | 1 | -1 | -j | j | 1 | j | 1 | -i |
| 47 | 1 | 1 | j | j | -1 | -j | -1 | j | 1 | -1 | -j | j | -1 | j | 1 | j |
| 48 | 1 | 1 | j | 1 | -1 | j | j | -j | 1 | -1 | j | -1 | -1 | -j | j | j | the following 7-, 10- or 15-sequence groups being used most preferably: 2, 8, 24, 28, 30, 35, 41 or 2, 8, 17, 21, 24, 28, 29, 35, 37, 39 or 7, 10, 12, 18, 19, 20, 25, 29, 31, 35, 39, 41, 44, 45, 47.

15. A receiver arranged to be used in a digital radio system comprising several base stations and subscriber terminals, which operate as transmitters and receivers for signals that propagate via channels and that are desired signals and/or interference signals and that comprise at least one predetermined sequence, the receivers being arranged to sample the signals, wherein the receiver comprises sequential means and grouping means for forming subsets of predetermined sequences from the predetermined sequences that are related to the signals to be received and that are stored in the sequential means, and the receiver comprises channel estimation means for carrying out channel estimation separately for each subset, the estimation being arranged to take place by means of the received signal samples and the subsets formed, and to form a channel estimate related to each subset, and the channel estimation means are arranged to form an estimate signal by means of the channel estimate and the predetermined sequence, and to compare the received signal and the estimate signal for the subset, and the channel estimation means are arranged to form, by means of said comparison strength estimates for the subset signals.

16. A receiver according to claim 15, wherein when the receiver comprises correlation means and diversity branches the signals of which are combined, the channel estimation means are arranged to form a channel estimate separately for each diversity branch, and the correlation means are arranged to form from the channel estimates a correlation result between the diversity branches, the combining and detection means being arranged to utilize this result to decrease the amount of interference.

17. A receiver according to claim 16, wherein the correlation means are arranged to form a correlation result substantially of only the desired signal and/or the interference signals.

18. A receiver according to claim 15, wherein when the channel estimate comprises taps, the channel estimation means are arranged to determine the strength estimate of the subset signals as a sum of the channel estimate taps.

19. A receiver according to claim 15, wherein each subset of the receiver comprises at least one common predetermined sequence that is most preferably the predetermined sequence of the signal of the transmitter in the actual coverage area of which the receiver is located.

20. A receiver according to claim 15, wherein the channel estimation means are arranged to carry out channel estimation such that each subset comprises substantially only the predetermined sequence of the signal of the transmitter in the actual coverage area of which the receiver is located, and the predetermined sequence of one other signal.

21. A receiver according to claim 15, wherein the grouping means are arranged to convert sequences outside the subset into noise.

22. A receiver according to claim 15, wherein the channel estimation means are arranged to carry out channel estimation by utilizing maximum likelihood type formation of a channel estimate.

23. A receiver according to claim 15, wherein when the radio system is a GSM system, the predetermined sequence is a training sequence of the GSM system.

* * * * *